US005562996A

United States Patent [19]
Kuriu et al.

[11] Patent Number: 5,562,996
[45] Date of Patent: Oct. 8, 1996

[54] MULTI-LAYER FILMS

[75] Inventors: Hiroki Kuriu; Akira Mita; Kazufumi Ueno; Yoshinori Matsumoto; Yoshihiro Wada, all of Moriyama; Masaaki Iwami, Nabari, all of Japan

[73] Assignee: Gunze Limited, Ayabe, Japan

[21] Appl. No.: 414,135

[22] Filed: Mar. 30, 1995

Related U.S. Application Data

[63] Continuation of Ser. No. 60,694, May 13, 1993, abandoned, which is a continuation of Ser. No. 721,014, Jun. 26, 1991, abandoned.

[30] Foreign Application Priority Data

Jun. 27, 1990 [JP] Japan ................................ 2-171115
Nov. 16, 1990 [JP] Japan ................................ 2-312162

[51] Int. Cl.$^6$ ........................... B32B 27/32; B32B 27/34
[52] U.S. Cl. ........................... 428/474.4; 428/475.5; 428/476.1; 428/476.3; 428/476.9; 428/910
[58] Field of Search ..................... 428/474.4, 475.5, 428/476.1, 476.3, 476.9, 910

[56] References Cited

U.S. PATENT DOCUMENTS

| | | | |
|---|---|---|---|
| 4,486,507 | 12/1984 | Schumacher | 428/476.1 |
| 4,695,491 | 9/1987 | Kondo et al. | 428/35 |
| 4,735,855 | 4/1988 | Wofford et al. | 428/349 |
| 4,888,223 | 12/1989 | Sugimoto et al. | |
| 4,908,272 | 3/1990 | Harada et al. | 428/412 |
| 4,963,426 | 10/1990 | Nishimoto et al. | 428/213 |
| 5,053,259 | 10/1991 | Vicik | 428/36.91 |
| 5,053,281 | 10/1991 | Sakashita et al. | 428/412 |
| 5,055,355 | 10/1991 | DeAntonis et al. | 428/476.3 |

FOREIGN PATENT DOCUMENTS

| | | |
|---|---|---|
| AN 89-206927 | 5/1989 | European Pat. Off. . |
| A-0318964 | 6/1989 | European Pat. Off. . |
| A-0358038 | 3/1990 | European Pat. Off. . |
| A-0408390 | 1/1991 | European Pat. Off. . |
| 52-147176 | of 1977 | Japan . |
| 53-157165 | of 1978 | Japan . |
| 55-43896 | 11/1980 | Japan . |
| 56-89944 | 7/1981 | Japan . |
| 57-159622 | 10/1982 | Japan . |
| 58-14743 | 1/1983 | Japan . |
| 59-13326 | 3/1984 | Japan . |
| 3-63133 | 3/1991 | Japan . |
| 222632 | 7/1989 | New Zealand . |

OTHER PUBLICATIONS

Search Report.

*Primary Examiner*—Dhirajlal Nakarani
*Attorney, Agent, or Firm*—Armstrong, Westerman, Hattori, McLeland & Naughton

[57] ABSTRACT

The invention provides a multi-layer film having 1 to 4 polyamide layers, characterized in that at least one polyamide layer comprises about 50 to about 95% by weight of a crystalline polyamide and about 50 to about 5% by weight of an amorphous polyamide and that the multi-layer film is produced by stretching a flat film at least in the lateral direction; and a process for preparing the multi-layer film.

13 Claims, No Drawings

MULTI-LAYER FILMS

This application is a continuation of application Ser. No. 08/060,694 filed May 13, 1993 now abandoned, which is a continuation of application Ser. No. 07/721,014 filed Jun. 26, 1991, now abandoned.

The present invention relates to a multi-layer film having at least one crystalline polyamide layer and a process for preparing the same.

Multi-layer films having crystalline polyamide layers are widely used for packaging foods and other products because of their toughness and excellent gas barrier property.

However, multi-layer films having crystalline polyamide layers entail the following problem. In manufacture of such multi-layer films on an industrial scale, a flat film extruded as from a T-die in extrusion molding is likely to rupture when stretched and is difficult to stably stretch. For this reason, these multi-layer films have been usually produced by extruding a tube by inflation method.

The multi-layer films produced by inflation method are irregular in thickness and show a great difference between the smallest and largest thicknesses as measured in their entirety so that the films tend to form waves and bowing with a lapse of time, making it difficult or impossible to accurately and rapidly perform, e.g., printing, particularly multicolor printing, working the film into bags and so on.

It is an object of the present invention to provide a multi-layer film having at least one polyamide layer which is free of the foregoing prior art problem and which is produced by stretching a flat film at least in the lateral direction to give a film that is regular in thickness.

It is another object of the invention to provide a process for preparing a multi-layer film having at least one polyamide layer, the process being capable of producing the multi-layer film on an industrial scale by stretching a flat film at least in the lateral direction.

These and other objects of the invention will become more apparent from the following description.

According to the present invention, there is provided a multi-layer film having 1 to 4 polyamide layers, characterized in that at least one polyamide layer comprises about 50 to about 95% by weight of a crystalline polyamide and about 50 to about 5% by weight of an amorphous polyamide and that the multi-layer film is produced by stretching a flat film at least in the lateral direction.

The present inventors' research revealed the following. When a mixture comprising a crystalline polyamide and a specific amount of an amorphous polyamide (hereinafter referred to as "mixed polyamides layer (A)" or simply as "A") is used to form at least one polyamide layer in a multi-layer film having 1 to 4 polyamide layers, the multi-layer film is imparted a remarkably improved stretchability, and a flat film extruded from a T-die or the like can be easily stretched on an industrial scale at least in the lateral direction without rupturing. The multi-layer film can achieve the improvement of stretchability due to the presence of any of the specified number of, namely 1 to 4, mixed polyamides layers (A). More specifically, because of the presence of the mixed polyamides layer or layers (A), the multi-layer film of the invention is not only enhanced in the toughness and gas barrier property among the inherent characteristics of polyamides, but also made regular in thickness on stretching of flat film at least in the lateral direction, making it possible to accurately and rapidly perform, e.g. printing, particularly multicolor printing, formation of bags and so on.

The term "crystalline polyamide" and the term "amorphous polyamide" used throughout the specification and the appended claims refer to a polyamide which is crystalline and a polyamide which is not crystalline, respectively, according to the standards for terminology in the art. These two types of polyamides can be distinguished for example by the following test. A non-stretched film specimen of polyamide (100 μm in thickness) is subjected to X-ray diffraction in a chamber at 22° C. and 50% RH using a goniometer and passing a current of 60 mA at a voltage of 30 KV under the conditions of scanning angle of 5° to 40°, scanning rate of 3°/min and slit at 1°, 1°, 0.15° from the specimen side. The film indicating no crystal peak can be identified as an amorphous polyamide, and the film showing crystal peaks as a crystalline polyamide.

The multi-layer films of the invention include those having at least one layer of a polymer other than polyamide and a single polyamide layer, which is the mixed polyamides layer (A), and those having or not having at least one layer of a polymer other than polyamide and having 2 to 4 polyamide layers among which at least one layer is the mixed polyamides layer (A), and the other polyamide layer or layers, if present, are a crystalline polyamide layer or layers. Desirable multi-layer films are those having at least one layer of a polymer other than polyamide and only one polyamide layer, which is the mixed polyamides layer (A) and those having at least one layer of a polymer other than polyamide and having two polyamide layers in which one or both are the mixed polyamides layers (A) and the other polyamide layer, if present, is a crystalline polyamide layer.

According to the invention, the crystalline polyamide is used for the mixed polyamides layer (A), or is used to constitute other polyamide layer or layers than the mixed polyamides layers (A) among a plurality of polyamide layers in the multi-layer film. Crystalline polyamides which are useful in the present invention include a variety of aliphatic and aromatic crystalline polyamides widely used in the field of films as packaging materials. Examples of useful aliphatic crystalline polyamides are nylon 6, nylon 66, nylon 610, nylon 12, a copolymer of nylon 6 and nylon 66, a copolymer of nylon 6 and nylon 610, a copolymer of nylon 6 and nylon 12, etc. Among them, preferred are nylon 6, a copolymer of nylon 6 and nylon 66, etc. Useful aromatic crystalline polyamides are various and include those having an aromatic ring in the main chain and/or the side chain, such as polyxylylene-type polymers prepared by polycondensation of meta- or para-xylylenediamine and dicarboxylic acid having 4 to 12 carbon atoms. Preferred among useful aromatic crystalline polyamides is polymetaxylyleneadipamide synthesized from metaxylylene-diamine and adipic acid. Such polymers have characteristics including a high gas barrier property, low water absorption capacity, low moisture permeability, etc. The above crystalline polyamides are usable singly or at least two of them can be used in mixture. A blend of aliphatic and aromatic polyamides, of course, can be used in the present invention. In this case, it is suitable to use a blend of about 3 to about 900 parts by weight, preferably about 30 to about 200 parts by weight, of aromatic polyamide per 100 parts by weight of aliphatic polyamide.

According to the invention, the mixed polyamides layer (A) is formed of a mixture comprising the crystalline polyamide and a specific amount of the amorphous polyamide.

Examples of useful amorphous polyamides are copolymers or terpolymers prepared using terephthalic acid, isophthalic acid or like dicarboxylic acid and hexamethylenediamine or like diamine. The amorphous polyamide exhibits a high gas barrier property under high humidity conditions.

In the present invention, the mixed polyamides layer (A) comprises about 50 to about 95% by weight of the crystalline polyamide and about 50 to about 5% by weight of the amorphous polyamide. When the amount of the amorphous polyamide is less than 5% by weight, it is difficult to stretch a flat film at least in the lateral direction. When not less than 50% by weight of amorphous polyamide is used, the layer (A) is deprived of the toughness among the inherent characteristics of polyamides. Preferred amounts of the two polyamides are about 75 to about 95% by weight of the crystalline polyamide and about 25 to about 5% by weight of the amorphous polyamide. Essentially the mixed polyamides layer (A) in the multi-layer film of the invention contains the crystalline polyamide and the amorphous polyamide in the above ratio. The layer (A) may contain other components which do not adversely affect the characteristics of the layer (A).

The multi-layer film of the invention has 2 or more layers in total, usually 3 to 7 layers in total, which include 1 to 4 polyamide layers. It is essential in the invention that at least one of 1 to 4 polyamide layers be the mixed polyamides layer (A). The layers other than the mixed polyamides layer (A) and than polyamide layers are composed of resins different from polyamides. For example, olefin resins are desirable as such resins. Examples of useful olefin resins are homopolymers or copolymers of olefins, copolymers of olefins and other comonomers copolymerizable with olefins such as vinyl monomers, modified olefin resins, etc. More specific examples of useful olefin resins are homopolymers and copolymers of olefins, such as low- to high-density polyethylenes (including low-density linear polyethylenes), polypropylenes and polybutenes, copolymers thereof, ionomers, ethylene-acrylic acid copolymers, ethylene-vinyl acetate copolymers, and so on. Typical examples of modified olefin resins are modified olefin resins prepared by copolymerization, e.g. graft copolymerization, of olefin resins with a suitable unsaturated carboxylic acid such as maleic acid, fumaric acid, acrylic acid or the like or a derivative such as an anhydride, ester or metal salt thereof. Useful modified olefin resins include mixtures of the above modified polymers alone or along with other components such as other olefin resins. These modified olefin resins can be suitably used as the adhesive resin layer in the present invention. Useful adhesive resins are not specifically limited to the modified olefin resins and include other resins such as ionomer resins, ethylene-ethyl acrylate copolymers, ethylene-vinyl alcohol copolymers, etc.

Among the foregoing olefin resins, desirable are low-density polyethylenes, low-density linear polyethylenes, ionomers, modified olefin resins, ethylene-vinyl acetate copolymers, etc. These olefin resins are usable singly or at least two of them can be used in mixture. The layer of such olefin resin can be conveniently used to form a heat sealing layer.

Gas barrier resins can be used for other layers. Useful gas barrier resins include said crystalline polyamides, acrylonitrile polymers, vinylidene chloride polymers, ethylene-vinyl alcohol copolymers (e.g. saponified ethylene-vinyl acetate copolymers having an ethylene content of about 20 to about 65 mole % and a saponification value of about 90% or more), aliphatic and/or aromatic polyamides, polyesters, and so on.

A preferred example of the multi-layer film according to the invention is composed of at least three basic layers, namely the mixed polyamides layer (A), a modified olefin resin layer (B) as an adhesive resin layer and a modified or unmodified olefin resin layer (C) superposed in this order. When required, the above multi-layer film may have one or more other resin layers on and/or under the three basic layers. The multi-layer film having the olefin resin layer (C) as the outermost layer exhibits a heat sealing property and is useful as a packaging material which requires a heat-sealing property. The multi-layer film may have the mixed polyamides layer (A) sandwiched between the unmodified or modified olefin resin layers (C),(C) optionally with the modified polyamide layer (B) inserted therebetween as an adhesive layer. This type of the multi-layer films have the advantages of reducing the dimensional variation occurring due to the hygroscopicity and preventing the occurrence of curling.

Another preferred example of the multi-layer films according to the invention has a plurality of mixed polyamides layers (A), or optionally the mixed polyamides layer (A) in combination with a crystalline polyamide layer (E) and/or another gas barrier resin layer (D) for increasing the gas barrier property. Preferred among gas barrier resins other than polyamides is a saponified ethylene-vinyl acetate copolymer having an ethylene content of about 20 to about 65 mole %, preferably about 25 to about 50 mole% and a saponification value of about 90% or more, preferably about 99% or more (hereinafter referred to as "EVOH").

However, EVOH has the drawbacks of exhibiting poor mechanical strength and tending to show unsatisfactory stretchability, as found in crystalline polyamide. In forming a multi-layer film having an EVOH layer and a polyamide layer, a flat film extruded from a T-die or the like is difficult to stretch on an industrial basis, usually necessitating the formation of film by inflation method. For this reason, multi-layer films having an EVOH layer and a polyamide layer suffer the problem of thickness irregularity.

For applications which require a high mechanical strength and an excellent gas barrier property, an attempt may be made to provide a multi-layer film having an EVOH layer placed between polyamide layers, but the obtained film is given a further diminished stretchability.

The present inventors' research found the following. When the multi-layer film has an EVOH layer (D-1) interposed between two polyamide layers at least one of which is the mixed polyamides layer (A), the obtained film, even if the other layer is of crystalline polyamide, would be given a markedly improved stretchability despite the presence of EVOH layer or a combination of EVOH layer and crystalline polyamide layer, and a flat film can be easily stretched at least in the lateral direction.

In this case, the EVOH layer (D-1) may be sandwiched directly between two mixed polyamides layers (A),(A) or directly between the mixed polyamides layer (A) and a crystalline polyamide layer (E) to provide a structure of A/D-1/A or E, or sandwiched therebetween via a layer (B) of adhesive resin such as modified olefin resin. In the latter case, the EVOH layer (D-1) is sandwiched between the mixed polyamides layers (A), (A) or between the layer (A) and the crystalline polyamide layer (E) so that the layers are superposed in the order of A/B/D-1/A or E, or A/B/D-1/B/A or E. The multi-layer films of the invention include not only the foregoing laminates of layers superposed as above, but also other laminates in which one or more olefin resin layers (C) and other layers are superposed thereon and/or thereunder.

As described above, the multi-layer film of the invention may have the EVOH layer (D-1) sandwiched between the mixed polyamides layers (A),(A) or between the layer (A) and the crystalline polyamide layer (E). These three layers all have a gas barrier property, so that the film is excellent in gas barrier property. Further the film is made tougher by reinforcing the fragile EVOH layer (D-1) with the polyamide layers (A),(A) or (A),(E) and, due to stretching of flat film, is imparted a regular thickness.

The multi-layer films of the invention have 1 to 4 polyamide layers among which at least one layer is the mixed polyamides layer (A), and the other polyamide layer or layers, if present, are a crystalline polyamide layer or layers (E), optionally in combination with one or more olefin resin layers (C) and one or more other gas barrier layers (D) than the layers (A) and (E). When the gas barrier layer (D) is an EVOH layer (D-1), the multi-layer film has a structure of the gas barrier layer (D-1) sandwiched between the layers (A), (A) or the layer (A) and the crystalline polyamide layer (E), if required in combination with one or more olefin resin layers (C) and one or more gas barrier layers (D-2) other than the layers (A), (D-1) and (E). If necessary, an adhesive resin layer (B) such as a modified olefin resin layer may be inserted between these layers. The EVOH layer (D-1) is not necessarily interposed between the two polyamide layers (A), (A) or (A),(E) and suffices insofar as it is superposed on the layer (A) with the adhesive resin layer (B) adhered therebetween.

Various combinations of resins layers can be used in the formation of multi-layer films according to the invention. Given below are examples of preferred combinations in which the alphabetical symbols used designate the following resin layers.

A: Mixed polyamides layer
B: Modified olefin resin layer
C: Unmodified or modified olefin resin layer
D-1: EVOH layer
D-2: Other gas barrier resin layer than layers (A) and (D-1)
E: Crystalline polyamide layer A/B/C, A/D-1 or D-2/C, A/D-1 or D-2/A or E, B/A/B, A/D-1 or D-2/B, B/A/B/C, A/D-1 or D-2/B/C, A/B/D-1 or D-2/B, B/D-1 or D-2/A/B, B/A/D-1 or D-2/B, A/D-1 or D-2/A or E/B/C, E/D-1 or D-2/A/B/C, A/B/D-1 or D-2/B/C, B/A/D-1 or D-2/B/C, B/D-1 or D-2/A/B/C, D-1 or D-2/A/ B/C, C/B/A/B/C, A/B/C/C, C/B/A/D-1 or D-2/A or E/B/C, B/A/D-1 or D-2/A or E/B/C, B/E/D-1 or D-2/A/B/C, A/D-1 or D-2/B/A or E/B/C, E/D-1 or D-2 B/A/B/C, A or E/D-1 or D-2A or E/D-1 or D-2/A, A/D-1 or D-2/A/D-1 or D-2/E, A or E/D-1 or D-2/A or E/D-1 or D-2/A or E/D-1 or D-2/A, A/D-1 or D-2/A/D-1 or D-2/A/D-1 or D-2/E, C/B/E/D-1 or D-2/A/B/C.

In any of these combinations, a plurality of layers (B) may be formed of the same or different modified olefin resins, and a plurality of layers (C) may be formed of the same or different unmodified or modified olefin resins In the above combinations, the layer (B) may be replaced by an ionomer resin layer, and the outermost layer may be replaced by a vinylidene chloride resin layer or a coated vinylidene chloride resin layer.

The overall thickness of the multi-layer film according to the invention is not specifically limited and can be suitably determined according to the utility and the purpose of the film. Yet typically the overall thickness of the film is in the range of about 8 to about 100 µm, preferably about 10 to about 80 µm. The thickness of each mixed polyamides layer (A) ranges from about 2 to about 40 µm, preferably about 3 to about 30 µm. The thickness of each EVOH layer (D-1) ranges from about 1 to about 30 µm, preferably about 2 to about 20 µm. The thickness of each modified olefin resin layer (B) serving as the adhesive resin layer ranges from about 1 to about 10 µm, preferably about 2 to about 7 µm.

The thickness of each unmodified or modified olefin resin layer (C) for imparting a heat sealing property ranges from about 1 to about 50 µm, preferably about 2 to about 40 µm.

The oxygen permeability of the multi-layer film of the invention is not specifically limited. Although variable over a wide range, a suitable oxygen permeability level to be achieved by, for example, a multi-layer film having a structure of A/D-1/A or A/D-1/E, may be 20 $cc/m^2$ or less per 24 hr in the atmosphere (20° C., 65% RH), preferably about 10 $cc/m^2$ or less per 24 hr in the atmosphere (20° C., 65% RH).

The multi-layer films of the invention may be heat-shrinkable, or may have little or no heat shrinkability according to a specific application. The percent heat shrinkage of the heat-shrinkable multi-layer film is not specifically limited and may be suitably selected. For example, the film may have a percent heat shrinkage, as measured by immersion of film in a hot water bath of 90° C. for 30 seconds, in the range of about 5 to about 50%, preferably about 10 to about 30%, in the longitudinal direction, and about 5 to about 50%, preferably about 10 to about 30%, in the lateral direction, or 0 to about 15%, preferably about 2 to about 8%, in the longitudinal direction, and about 10 to about 50%, preferably about 15 to about 40%, in the lateral direction.

Such heat-shrinkable film can be suitably used for various modes of shrink packaging. For example when used for shrink packaging of meat products and the like, the heat-shrinkable film of the invention can cover the meat product to achieve a close contact therewith, thereby preventing accumulation of gravy or the like which might occur after a lapse of time.

The film of the invention having little or no heat shrinkability may have a percent heat shrinkability, when immersed in a hot water bath of 90° C. for 30 seconds, in the range of about 5% or less, preferably 0 to about 3%, in the longitudinal direction, and about 5% or less, preferably 0 to about 3%, in the lateral direction. These multi-layer films are useful for applications as packaging materials or for other purposes in which heat shrinkability is or is not required.

In preparation of a multi-layer film according to the invention, a flat film is formed and, for example, sequentially stretched. A flat film is extruded usually from a T-die by means of co-extrusion techniques, and is monoaxially stretched in the lateral direction or sequentially biaxially stretched. The film formation is not specifically limited. Usually a flat film is forced out onto a chill roll by extrusion casting and is stretched in a sequential manner or by a separate procedure. Preferred is biaxial stretching to be sequentially performed. Generally the required stretching is conducted in the longitudinal direction by a roll stretching device and in the lateral direction by a tenter to which the stretching means, however, are not specifically limited. The stretching conditions depend on the properties of the polymers used for the multi-layer film and are not critical. Biaxial stretching, for example, is conducted to achieve drawing about 2 to about 5 times in the longitudinal direction and about 2 to about 6 times in the lateral direction (the order of longitudinal and lateral stretching may be reverse). Longitudinal stretching is performed at about 60° to about 120° C., preferably about 70° to about 100° C., and lateral stretching at about 70° to about 180° C., preferably about 100° to about 160° C.

In monoaxial stretching only in the lateral direction, for example, a tenter is usable under the same conditions employed in lateral stretching as above, such as stretch ratio, temperatures, etc. which, however, are not specifically limitative.

After stretching, heat treatment is effected when so required. Yet heat treatment may be dispensed with when a film of high heat shrinkability is produced. Heat treatment can be performed by any suitable means, frequently by a tenter sequentially on lateral stretching. The film to be heat-treated may be one laterally lessened in tension by up to 20%, preferably about 3 to about 10%, or one having the same width as, or a width longer than, in lateral stretching. The temperature for heat treatment is variable with the preparation of a heat-shrinkable multi-layer film or a multi-layer film having little or no heat shrinkability. The temperature is generally in a low temperature range in the former case and in a high temperature range in the latter case. For example, in preparing a heat-shrinkable multi-layer film, the film may be heat-treated by a tenter at a temperature of not higher than about 150° C., preferably about 80° to about 130° C., when required in a state as laterally lessened in tension by about 20% or less, preferably about 3 to about 10%. In preparing a multi-layer film with little or no heat shrinkability, the film may be heat-treated by a tenter at a temperature of not lower than about 150° C., preferably about 180° to about 250° C., when required in a state as laterally lessened in tension by about 20% or less, preferably about 3 to about 10%. However, these conditions are described only as examples to which the invention is not limited. In preparing a heat-shrinkable multi-layer film, heat treatment is performed to prevent spontaneous shrinkage presumably unlike the heat treatment in preparing a multi-layer film having little or no heat shrinkability and intended to be conducted to reduce the heat shrinkability.

The multi-layer films of the invention can be used for various applications, for example, as packaging materials for foods such as meat, processed meat products, retort pouch foods, moist foods, microwave oven-cookable foods, frozen foods, and for other products. The film can be also made into containers by deep drawing forming. In short, the multi-layer films of the invention find uses not specifically limited and are employable for a wide range of applications in various fields.

The multi-layer films of the invention are used in the various mode of packaging. For example, the films are overlapped after wrapping up, or are used in packaging as a sleeve, or can be heat-sealed into a bag. The films are provided as a tube to be heat-sealed in longitudinal center and can be used merely by cutting the film to length. In short, the films of the invention can be used by various methods which are not specifically limited.

The present invention will be described below in greater detail with reference to the following examples and comparison examples.

EXAMPLE 1

Forced out from a T-die by co-extrusion onto a chill roll with cooling water being circulated therein was a flat three-layer film composed of a mixed polyamides layer (A) consisting of 80% by weight of nylon 6 and 20% by weight of an amorphous polyamide, an adhesive resin layer (B) containing a low-density modified linear polyethylene and a low-density linear polyethylene, and a low-density linear polyethylene layer (C) superposed in this order. The flat film was stretched 3 times in the longitudinal direction by a roll stretching device at 80° C., and stretched 3.5 times in the lateral direction by a tenter in the atmosphere at 120° C. Then the film was heat-treated for fixation by the same tenter in the atmosphere at 100° C. while the tension of the film is relaxed by about 4%. The three layers (A), (B) and (C) in the obtained film were 10, 2 and 20 μm, respectively in the thickness. The film had a percent heat shrinkage of 15% in the longitudinal direction and 20% in the lateral direction as measured by immersion in hot water of 90° C. for 30 seconds. The film attained a maximum thickness difference of 3.0 μm and was regular in thickness.

The term "maximum thickness difference" used herein refers to a difference between the largest and the smallest thicknesses among the measurements obtained at ten spots spaced equidistantly from each other in the lateral direction, the ten spots being positioned in a film area trimmed over a distance of 10 cm from the grip end of the tenter clip.

Comparison Example 1

An attempt was made to prepare a heat-shrinkable multi-layer film by the same procedure as in Example 1 except that only nylon 6 was used to form a layer which replaced the mixed polyamides layer (A) used in Example 1 The flat film, however, was ruptured at numerous locations when stretched by the tenter under the same conditions as in Example 1, making it impossible to perform stable stretching.

Comparison Example 2

A film was produced in the form of a tube using the same materials as in Example 1 by inflation method, and stretched 3 times respectively laterally and longitudinally at the same time in this state at 90° C., followed by heat treatment at 100° C., whereby a multi-layer film was obtained which had a percent heat shrinkage of about 15% both in the longitudinal direction and in the lateral direction as measured by immersion in hot water of 90° C. for 30 seconds. The layers (A), (B) and (C) in the film had thicknesses of 15 5, and 30 μm, respectively. The film had a maximum thickness difference of 10 μm, and was markedly irregular in thickness.

EXAMPLES 2 to 7

In Example 2, using the same resins as used in Example 1, the same procedure as in Example 1 was followed except that the procedure was intended to give a film of 5 layers having a structure of C/B/A/B/C.

In Example 3, the same procedure as in Example 1 was repeated with the exception of conducting the heat treatment in the atmosphere at 200° C., whereby a multi-layer film having a low heat shrinkability was obtained.

In Examples 4 to 7, multi-layer films were prepared in the same manner as in Example 1 except under the conditions listed below in Table 1 on the materials used, thickness, stretching temperature, stretch ratio and heat-treating temperature.

In Table 1, the following symbols indicate:

LL: low-density linear polyethylene $LL_1$: low-density high-melting linear polyethylene $LL_2$: low-density low-melting linear polyethylene MLL: a mixture of low-density modified linear polyethylene
and low-density linear polyethylene PA: a mixture of nylon 6 and amorphous polyamide (resin of the type used in Example 1)

PP: polypropylene

MPP: a mixture of modified polypropylene and polypropylene $PA_1$: a mixture of 100 parts by weight of nylon 6, 100 parts of aromatic polyamide and 20 parts by weight (9.1% by weight) of amorphous polyamide The multi-layer films thus obtained had the characteristics and specific applications as described below.

The multi-layer film prepared in Example 2 was excellent in an ability to prevent curling, had a property of enabling sealing as in an envelope, and was preferably usable as a heat-shrinkable packaging material for boiled foods, meat and other foods and as a casing for processed meat products.

The multi-layer film prepared in Example 3 had the same characteristics as the film of Example 2, and was usable in the field as described in Example 2 but limited to non-heat shrink packaging. The film is also usable as a packaging material for frozen foods and other foods.

The multi-layer film prepared in Example 4 had an enhanced sealing property so as to enable sealing inside.

The multi-layer film prepared in Example 5 had an improved sealing property and an increased heat resistance on one side thereof.

The multi-layer film prepared in Example 6 had an increased heat resistance and was suitable as a packaging material for retort pouch foods.

The multi-layer film prepared in Example 7 was useful as a packaging material for foods and the like which require a high degree of gas barrier property.

The above applications are only desirable ones to which the obtained multi-layer films are not limited.

thickness difference of 3.0 μm and was regular in thickness. The oxygen permeability of the film was 7 cc/m$^2$ per 24 hr in the atmosphere (20° C., 65% RH).

Comparison Example 3

An attempt was made to prepare a heat-shrinkable multilayer film by the same procedure as in Example 8 except that a polyamide layer formed of only nylon 6 was used in place of the mixed polyamide layers (A) used in Example 8. The flat film, however, was ruptured at numerous locations when stretched by a tenter under the same conditions as in Example 8, making it impossible to achieve stable stretching.

Comparison Example 4

A multi-layer film with layers superposed in the order of C/B/A/B/C (20, 3, 14, 3, 20 μm, respectively in thickness) was produced from the same resins as used in Example 2 by inflation method under the same producing conditions as in Comparison Example 2. The film was heat-treated at 200° C.

The film attained a maximum thickness difference of 12 μm, and was markedly irregular in thickness. The film had a percent heat shrinkage of 1% both in the lateral direction

TABLE 1

| | Layer component & thickness (μm) | | | | Stretching temperature, Stretch ratio (Longitudinally × Laterally) | Heat treatment temperature (°C.) | Percent heat shrinkage (%) | | Maximum thickness difference (μm) | Thickness irregularity |
|---|---|---|---|---|---|---|---|---|---|---|
| | C | B | A | B | C | | | Longitudinally | Laterally | | |
| Ex. 2 | LL 18 | MLL 2 | PA 10 | MLL 2 | LL 18 | 80 × 120° C. 3 × 3.5 times | 100 | 15 | 25 | 3 | Slight |
| Ex. 3 | LL 18 | MLL 2 | PA 10 | MLL 2 | LL 18 | 80 × 120° C. 3 × 3.5 times | 200 | 1 | 1 | 3 | Slight |
| Ex. 4 | LL 10 | MLL 2 | PA 10 | MLL 2 | LL 25 | 80 × 140° C. 3 × 3.5 times | 200 | 1 | 1 | 3 | Slight |
| Ex. 5 | LL$_1$ 10 | MLL 2 | PA 10 | MLL 2 | LL$_2$ 25 | 80 × 140° C. 3 × 3.5 times | 200 | 1 | 1 | 3 | Slight |
| Ex. 6 | PP 10 | MPP 2 | PA 10 | MPP 2 | PP 25 | 80 × 140° C. 3 × 3.5 times | 200 | 1 | 1 | 4 | Slight |
| Ex. 7 | LL 10 | MLL 2 | PA$_1$ 10 | MLL 2 | LL 25 | 80 × 140° C. 3 × 3.5 times | 200 | 1 | 1 | 3 | Slight |

Note:
Percent heat shrinkage was determined by immersion of film in hot water of 90° C. for 30 seconds.

EXAMPLE 8

Forced out from a T-die by co-extrusion onto a chill roll with cooling water being circulated therein was a flat three-layer film composed of two mixed polyamides layers (A), (A) each consisting of 90% by weight of nylon 6 and 10% by weight of the same amorphous polyamide as used in Example 1, and a layer (D-1) of saponified ethylene-vinyl acetate copolymer having an ethylene content of 44 mole % and a saponification value of not lower than 99% (melting point 164° C.) so that the three layers were superposed in the order of A/D-1/A. The flat film was stretched 3 times in the longitudinal direction by a roll stretching device at 80° C., and stretched 3.5 times in the lateral direction by a tenter in the atmosphere at 140° C. Then the film was heat-treated for fixation by the same tenter in the atmosphere at 100° C. while the tension of the film is laterally relaxed by about 4%. The three layers (A), (D-1) and (A) in the obtained film were all 5 μm in the thickness. The film had a percent heat shrinkage of 15% in the longitudinal direction and 20% in the lateral direction as measured by immersion in hot water of 90° C. for 30 seconds. The film attained a maximum and in the longitudinal direction as measured by immersion in hot water of 90° C. for 30 seconds.

EXAMPLE 9

A multi-layer film with layers superposed in the order of A/B/C (20, 6, 30 μm, respectively in thickness) was produced from the same resins as used in Example 1 by the same procedure as in Example 1. The film was stretched 4.5 times in the lateral direction by a tenter at 120° C. and heat-treated for fixation in the atmosphere at 100° C., The film was a heat-shrinkable laterally monoaxially stretched one having a percent heat shrinkage of 4% in the longitudinal direction and 30% in the lateral direction as measured by immersion in hot water of 90° C. for 30 seconds, and a maximum thickness difference of 4.0 μm.

EXAMPLE 10

Using the same resins as used in Example 8, a flat three-layer film with the layers superposed in the order of A/D-1/A was forced out from a T-die by co-extrusion onto a chill roll with cooling water being circulated therein. The flat film was stretched 3 times in the longitudinal direction by a roll stretching device at 80° C., and stretched 3.5 times in the lateral direction by a tenter in the atmosphere at 140° C. Then the film was heat-treated for fixation by the same tenter in the atmosphere at 210° C. while the tension of the film is lessened by about 4%. In this way, there were produced two multi-layer films in which the D-1 layer in one of the films was differentiated in the thickness from the corresponding layer in the other by changing the number of revolutions of screw rotated during the film formation. The three layers A, D-1, A in the films were 5, 5, 5 μm and 5, 10, 5 μm, respectively in the thickness. The films had a percent heat shrinkage of 1% both in the longitudinal direction and in the lateral direction as measured by immersion in hot water of 90° C. for 30 seconds. The films attained a maximum thickness difference of 3.0 μm and was regular in thickness. The oxygen permeability values of the films was 7 cc/m$^2$ per/24 hr in the atmosphere (20° C., 65% RH) and 4 cc/m$^2$ per 24 hr in the atmosphere (20° C., 65% RH).

EXAMPLE 11 to 16

In Example 11, a heat-shrinkable multi-layer film was prepared from the same resins as used in Example 8 in the same manner as in Example 8 except that the film was composed of 5 layers of A/D-1/A/B/C (B=low-density modified linear polyethylene and C=low-density linear polyethylene).

In Example 12, a multi-layer film having a low heat shrinkability was prepared in the same manner as in Example 8 except that the heat treatment was conducted in the atmosphere at 210° C.

In Examples 13 to 16, multi-layer films were prepared in the same manner as in Example 1 under the producing conditions (materials used, thickness, stretching temperature, stretch ratio, heat-treating temperature, etc.) as shown below in Table 2.

In Table 2, the symbols used represent the same resins as described hereinbefore for Table 1. PA$_2$ indicates a nylon 6-nylon 66 copolymer.

The multi-layer films thus obtained had the characteristics and desirable uses as described below.

The multi-layer film prepared in Example 11 was preferably usable as a heat-shrinkable packaging material for boiled foods, meat and other foods and as a casing for processed meat products.

The multi-layer film prepared in Example 12 had the same characteristics as the film of Example 11, and was useful for non-heat shrink packaging in the same field as described in Example 11 and also employable as a packaging material for frozen foods and other foods.

The multi-layer film prepared in Example 13 had an enhanced sealing property.

The multi-layer film prepared in Example 14 had an increased heat resistance.

The multi-layer film prepared in Example 15 had an increased heat resistance and was suitable as a packaging material for retort pouch food.

The multi-layer film prepared in Example 16 was suited as a packaging material for foods and others which require a high degree of gas barrier property.

The above applications are only desirable ones to which the obtained multi-layer films are not limited.

TABLE 2

| | Layer component & thickness (μm) | | | | | Stretching temperature, Stretch ratio (Longitudinally × Laterally) | Heat treatment temperature (°C.) | Percent heat shrinkage (%) | | Maximum thickness difference (μm) | Thickness irregularity |
|---|---|---|---|---|---|---|---|---|---|---|---|
| | A | D | A | B | C | | | Longitudinally | Laterally | | |
| Ex. 11 | PA 5 | EVOH 5 | PA 5 | MLL 2 | LL 18 | 80 × 120° C. 3 × 3.5 times | 100 | 15 | 25 | 3 | Slight |
| Ex. 12 | PA 5 | EVOH 5 | PA 5 | MLL 2 | LL 18 | 80 × 120° C. 3 × 3.5 times | 210 | 1 | 1 | 3 | Slight |
| Ex. 13 | PA 5 | EVOH 5 | PA 5 | MLL 2 | LL$_2$ 20 | 80 × 140° C. 3 × 3.5 times | 210 | 1 | 1 | 3 | Slight |
| Ex. 14 | PA$_1$ 10 | EVOH 5 | PA 10 | MLL 2 | LL$_1$ 25 | 80 × 140° C. 3 × 3.5 times | 210 | 1 | 1 | 3 | Slight |
| Ex. 15 | PA 10 | EVOH 5 | PA$_2$ 5 | MPP 2 | PP 25 | 80 × 140° C. 3 × 3.5 times | 210 | 1 | 1 | 4 | Slight |
| Ex. 16 | PA$_2$ 5 | EVOH 10 | PA$_1$ 5 | MLL 2 | LL 25 | 80 × 140° C. 3 × 3.5 times | 210 | 1 | 1 | 3 | Slight |

Note:
Percent heat shrinkage was determined by immersion of film in hot water of 90° C. for 30 seconds.

We claim:

1. A multi-layer film comprising at least three layers wherein a layer of saponified ethylene-vinyl acetate copolymer (D-1 having an ethylene content of about 20 to about 65 mole % and a saponification value of at least about 90% is sandwiched between mixed polyamides layers (A), said mixed polyamides layer (A) comprising about 50 to about 95% by weight of at least one of an aliphatic crystalline polyamide, an aliphatic crystalline copolymer of aliphatic polyamides, or a mixture of aliphatic crystalline polyamide and aromatic crystalline polyamide and about 50 to about 5% by weight of an amorphous polyamide, said multi-layer film being one produced by co-extrusion of a flat film onto a chill roll and sequentially stretching the flat film in the longitudinal direction and lateral direction or in the lateral direction and longitudinal direction, said multi-layer film having a maximum thickness difference of 4 μm or less.

2. A multi-layer film according to claim 1 wherein the film is heat-shrinkable and has a percent heat shrinkage, as measured by immersion in a hot water bath of 90° C. for 30 seconds, in the range of about 5 to about 50% in the longitudinal direction and about 5 to about 50% in the lateral direction.

3. A multi-layer film according to claim 1 wherein the film has a percent heat shrinkage, as measured by immersion in a hot water bath of 90° C. for 30 seconds, in the range of up to 5% in the longitudinal direction and up to 5% in the lateral direction.

4. A multi-layer film according to claim 1 wherein the aliphatic crystalline polyamide is at least one member selected from the group consisting of nylon 6, nylon 66, nylon 610, nylon 12, a copolymer of nylon 6 and nylon 66, and a copolymer of nylon 6 and nylon 610.

5. A multi-layer film according to claim 1 wherein the aromatic crystalline polyamide is a polyxylylene polymer prepared by polycondensation of meta- or para-xylylenediamine and dicarboxylic acid having 4 to 12 carbon atoms.

6. A multi-layer film according to claim 1 wherein the amorphous polyamide is a polymer which is substantially not crystalline or is non-crystalline and which is prepared from aromatic dicarboxylic acid and diamine.

7. A multi-layer film according to claim 6 wherein the aromatic dicarboxylic acid is at least one of terephthalic acid and isophthalic acid, and the diamine is hexamethylenediamine.

8. A multi-layer film according to claim 1 wherein the film is sequentially biaxially stretched about 2 to about 5 times in the longitudinal direction and stretched about 2 to about 6 times in the lateral direction.

9. A multi-layer film according to claim 1 wherein heat treatment is conducted sequentially on sequential biaxial stretching.

10. A multi-layer film according to claim 1 wherein the film has an oxygen permeability of 20 $cc/m^2$ or less per 24 hr in the atmosphere (20° C., 65% RH).

11. A multi-layer film according to claim 1 wherein at least one of an unmodified and a modified olefin resin layer (C) is laminated over one or both of the mixed polyamides layers (A).

12. A multi-layer film according to claim 1 wherein the at least one of the unmodified and the modified olefin resin layer (C) is adjacent to one or both of mixed polyamides layers (A).

13. A multi-layer film according to claim 1 which, in addition to the three layers, contains at least one layer selected from the group consisting of mixed polyamides layers (A) and at least one crystalline polyamide layer (E), and has a total of at least four layers.

* * * * *